April 26, 1960 R. A. JEWELL ET AL 2,934,372
VEHICLE BODY AND STRUCTURAL ELEMENTS THEREFOR
Filed Jan. 16, 1958 4 Sheets-Sheet 1
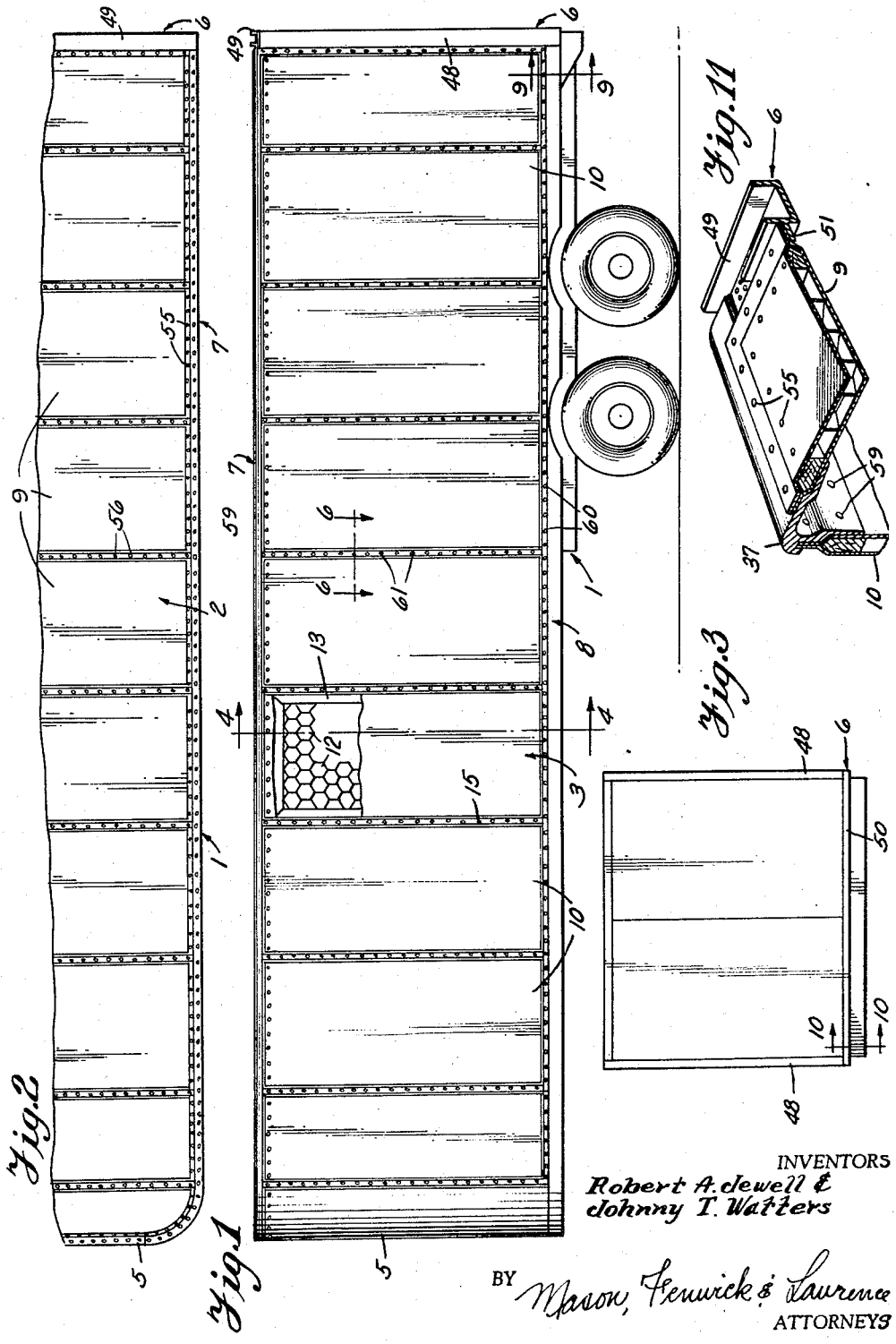
INVENTORS
Robert A. Jewell &
Johnny T. Watters
BY Mason, Fenwick & Lawrence
ATTORNEYS

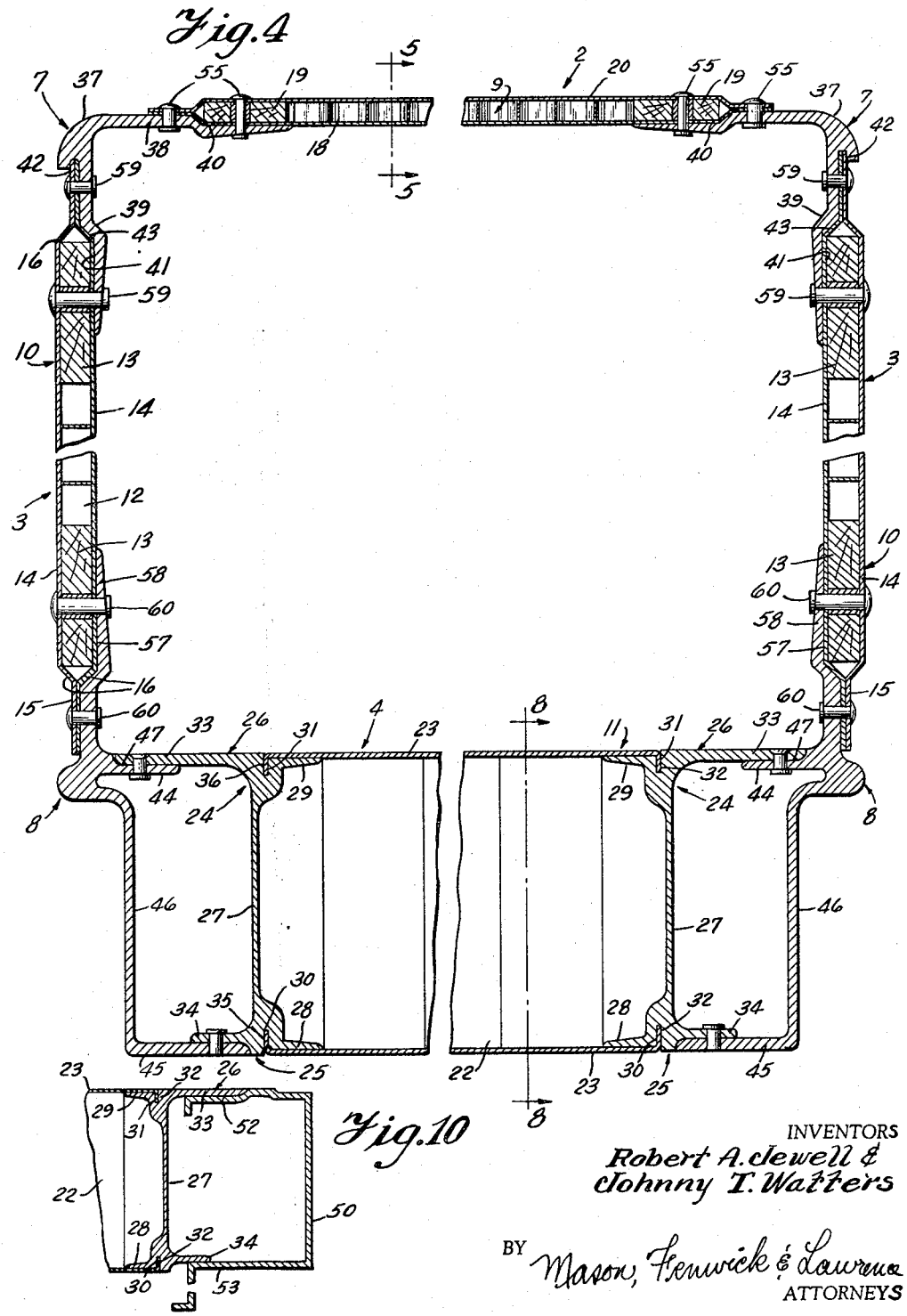

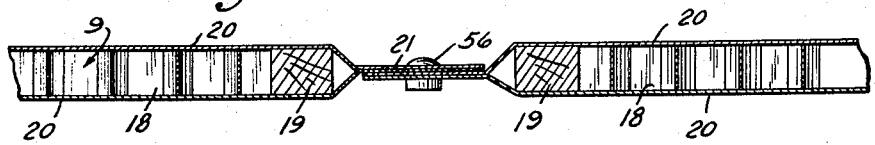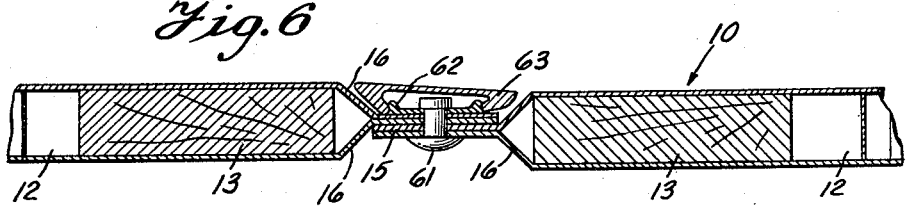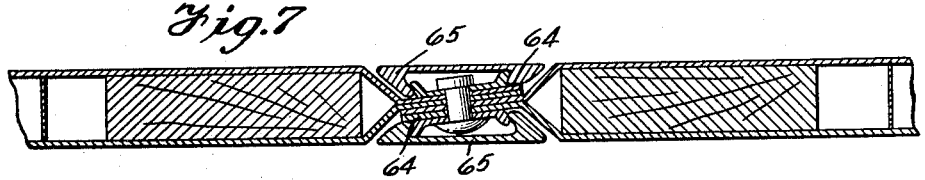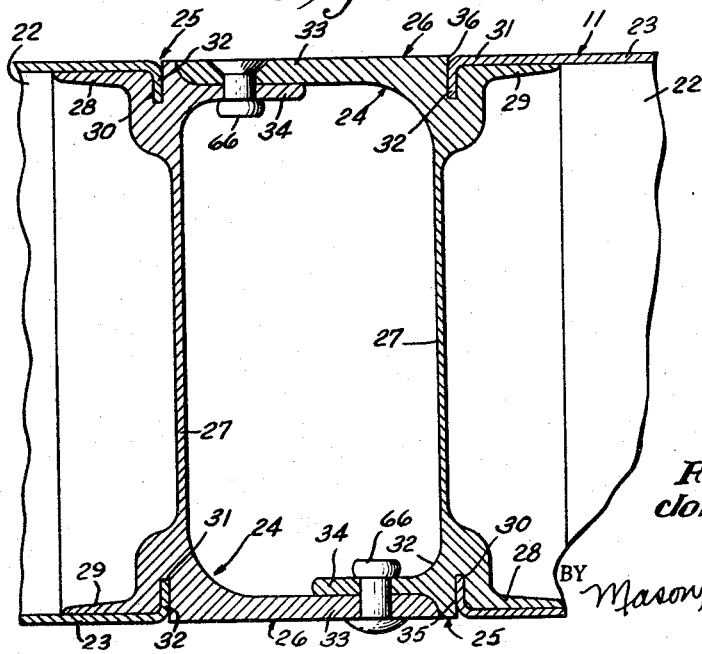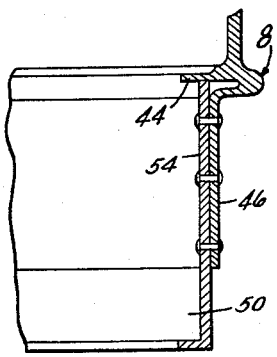

April 26, 1960 R. A. JEWELL ET AL 2,934,372
VEHICLE BODY AND STRUCTURAL ELEMENTS THEREFOR
Filed Jan. 16, 1958 4 Sheets-Sheet 4
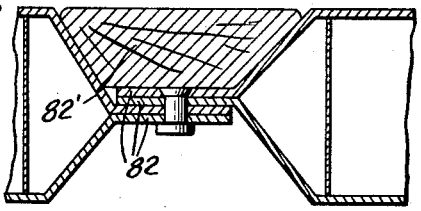
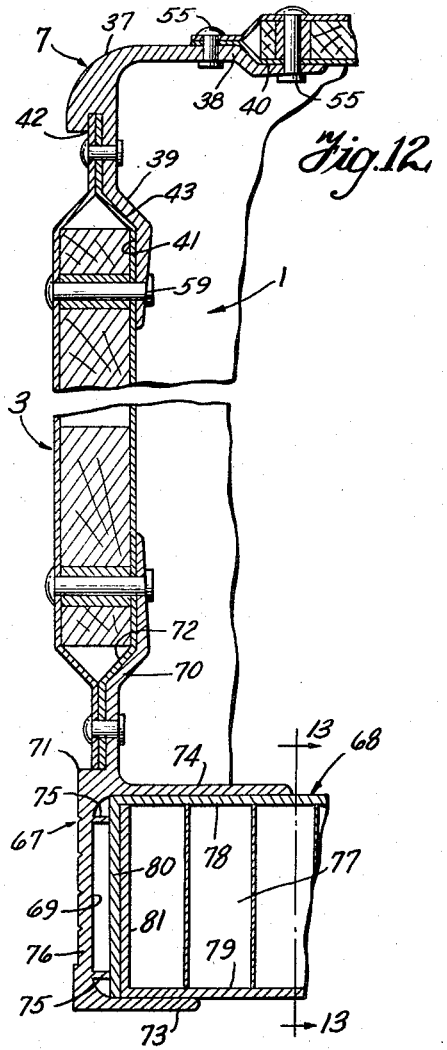
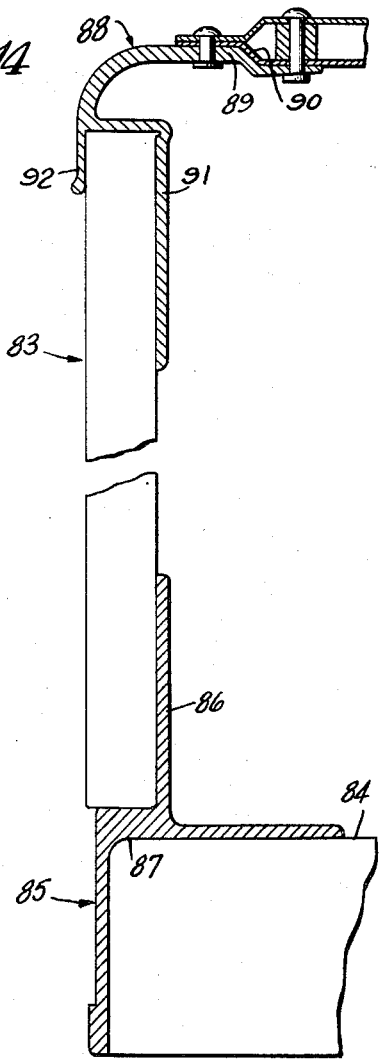
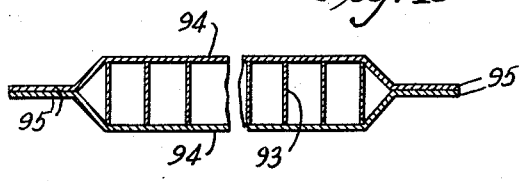
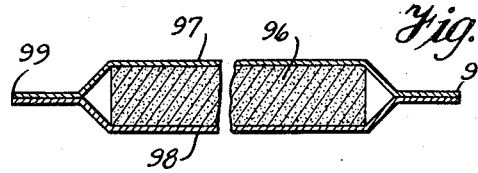
INVENTORS
Robert A. Jewell &
Johnny T. Watters
BY Mason, Fenwick & Lawrence
ATTORNEYS United States Patent Office 2,934,372
Patented Apr. 26, 1960

2,934,372

VEHICLE BODY AND STRUCTURAL ELEMENTS THEREFOR

Robert A. Jewell and Johnny T. Watters, Savannah, Ga., assignors to Great Dane Trailers, Inc., Savannah, Ga., a corporation of Georgia Application January 16, 1958, Serial No. 709,337

15 Claims. (Cl. 296—28)

This invention relates to truck or trailer body construction, particularly to a prefabricated structure of the box type, and to the structural components making up the body.

It has been the practice to build truck or trailer bodies to order, or to certain standards, but the construction has been, to a large extent, a custom building. The parts have been made to order, as needed, and each body constructed as a unit.

It is the object of the present invention to provide a trailer box-type body construction which will permit the prefabrication of body elements from which trailer bodies of various sizes and styles may be assembled, with a minimum of variation of stock sizes required to produce the entire range of wanted bodies.

A more specific object is the provision of means to form skeletal framework for trailer bodies and panels by means of which the skeletal frames can be enclosed.

A still more specific object of the invention is to provide a plurality of extruded rail forms for use with front and rear frame members to outline a box-type body shape to be completed by the application of covering material.

Another object is the provision of panels, consisting of cores and cover sheets, in standard sizes for forming the enclosing members of trailer bodies.

A further object is to provide panels having core members and cover sheets with perimetric attaching flanges and means to prevent crushing the cores under stress loads.

Other objects of the invention will become apparent from the following description of practical embodiments thereof, when taken in conjunction with the drawings which accompany, and form part of, this specification.

In the drawings:

Figure 1 is a side elevation of a trailer body constructed in accordance with the present invention;

Figure 2 is a partial top plan view thereof;

Figure 3 is a rear view of the trailer body;

Figure 4 is a vertical, transverse section through the body, taken on the line 4—4 of Figure 1;

Figure 5 is a fragmentary section taken on the line 5—5 of Figure 4, showing a typical joint between two roof panels;

Figure 6 is a similar section taken on the line 6—6 of Figure 1 and showing a joint between two side panels;

Figure 7 is a view similar to Figure 6 showing a slightly different side panel joint;

Figure 8 is a vertical section taken on the line 8—8 of Figure 4, illustrating a typical floor panel joint;

Figure 9 is a section on the line 9—9 of Figure 1 showing the connection of the bottom frame rail to the rear frame boxing;

Figure 10 is another section through the lower part of the rear frame, showing the seating of a floor panel on the bottom of the rear frame;

Figure 11 is a perspective view of a portion of a rear top corner of the body;

Figure 12 is a partial vertical section through a trailer showing a different bottom rail and bottom panel;

Figure 13 is a vertical section taken on the line 13—13 of Figure 12, showing a transverse joint between adjacent floor panels;

Figure 14 is a view similar to Figure 12 showing a trailer with conventional wall and floor structure, but with a panel type roof, with the top and bottom rails needed for this construction;

Figure 15 is a section through a modified panel, the central portion of the panel being removed; and Figure 16 is a view similar to Figure 14 illustrating a panel having a solid core.

In general, the invention consists of a truck or trailer body of box type, composed of a frame of front and back members interconnected by extruded top and bottom rails, with the top, sides and bottom of the body enclosed by prefabricated panels. The invention concerns also the extruded rails and the enclosing panels.

Referring to the drawings in detail, and first adverting to that form of the invention shown in Figures 1 to 11, there is shown a trailer having a body 1 of box-like form, with a top 2, sides 3 and bottom 4. The trailer includes a front frame 5, the shape and construction of which is not important to the present invention, and a substantially rectangular rear frame 6, the two frame members 5 and 6 being connected by top rails 7 and bottom rails 8. The body is enclosed, or the spaces between the rails filled, by roof panels 9, side panels 10 and bottom panels 11.

It is believed that the invention will be understood best if the various components from which the body is constructed are each described in detail before discussing further the body as a whole.

The panels are all rectangular in shape, having attaching flanges extending completely around their perimeters. They will be made in standard widths, several widths being contemplated, so that trailers of various stock lengths can be constructed from multiples of the standard widths. The top and bottom panels will be of uniform length and the side panels will vary in length in accordance with desired body height.

The side panels of the form being described are constructed of a core 12, a frame 13 surrounding the core and aluminum sheets or skins 14 fixed to the sides of the core. The core is of the well-known honeycomb type, consisting of a plurality of strips adhered at spaced intervals and expanded to form an overall pattern of polygonal cells. The material of the strips may be of any suitable material such as metal, paper, etc. If paper is used, the paper is impregnated with resin and set in its expanded form. The honeycomb core is surrounded by the wooden frame 13, which is of the same depth as the core, to hold the aluminum sheets 14 in proper spaced relation and prevent strains being imposed upon the core. The frame may be adhered, or otherwise secured, to the core if desired.

When the core and frame are assembled, the aluminum sheets 14, forming the outer skin, are applied to the sides and adhered to the core. The sheets 14 are longer and wider than the core and frame assembly and project beyond the frame on all edges. The projection is uniform around the panel. The projecting edge portions of the sheets are brought together in surface contact to form an attaching flange 15 extending completely around the panel. The two sheets are bent inwardly from the planes of the sides of the panel equal amounts to form the flange, so that the flange will lie substantially medially of the side surfaces of the body of the panel. Thus, there will be equal inclined wall sections 16 interconnecting the flange and body surfaces on both sides of the flange completely around the panel. Due to this arrangement, stresses applied to the attaching flanges will be distributed equally to both wall-forming sheets, resulting in greater panel strength and longer panel life.

The top panels are shown as identical in construction to the side panels, the only difference being in the thickness. Less strain is imposed upon the top panels and they, therefore, can be thinner. The top panels each consists of a core 18, frame 19, and skins 20 which are brought together to form a surrounding flange 21.

The bottom panels, which are subjected to much greater strains than the others, are considerably thicker and have an extrusion for an edging. The panels have cores 22, similar to those described but thicker, and sheet metal covering or skin 23. The edging members 24 serve as surrounding frame and mounting flange.

The edging extrusions are of general I-beam cross-section, having a base 25, head 26 and vertical connecting web 27. The base flange 28 and head flange 29 on one side of the central web are identical to make the extrusion reversible. These are the flanges which fit between the cover sheets 23 and against the edge of the core. The distance from the outside surface of the flange 28 to the outside surface of flange 29 is equal to the thickness of the core, so that the cover sheets will lie flush upon them. The extrusion is grooved longitudinally in the head and base near the plane of the vertical web to provide grooves 30 and 31 at the rear edges of the cover sheet receiving surfaces of the flanges 28 and 29 into which the angularly bent edges 32 of the cover sheets may be inserted and held. This provides attachment of the extrusion to the rest of the panel assembly. As the flanges 28 and 29 are identical the attachment can be made irrespective of which end of the extrusion is turned up. One long side, which will extend transversely of the trailer, and both short sides, which extend longitudinally of the trailer, will have the extrusion secured in one position. The other long side will be reversed. This permits ship-lapping the base panels and placement and removal of any one, as will be described.

On the opposite side of the vertical web, the base flange 33 and the head flange 34 are differently located and shaped from the flanges 28 and 29 and from one another. The back walls 35 and 36 of the grooves 30 and 31 are higher than the front walls to bring the outer surfaces of the extrusion to the plane of the outer surfaces of the cover sheets. The flange 33 is coextensive with this surface and is a relatively long flange. The flange 34 is but half the length of flange 33 and is recessed upwardly from the bottom surface of the extrusion a distance equal to the thickness of the flange 33, so that a flange 33 of an inverted extrusion on an adjacent panel may seat in it and lie flush with the bottom surface to produce a flush floor.

The top rails 7 are extruded members and are generally right-angular in cross-section to form the top edges of the body and provide means for securing the top and side panels at their ends. The corner 37 of the rail can be rounded to merge the top and side surfaces smoothly into one another. From the corner, extend a top flange 38 and a side flange 39.

The top flange 38 is rabbeted along its outer top edge to form a seat 40 to receive the ends of the roof panels 9. The depth of the seat is such that the panels, in the area of the frame 19 rest upon it while the peripheral flanges 21 lie upon the upper surface of the flange 38. The seat is of sufficient length to underlie substantially the width of the frame members 19. If desired, the edge of the seat may be inclined to conform to the inclined walls of the panel adjacent the flange.

The vertical side flanges 39 of the top rails also have seats, indicated at 41, at their outer ends to receive the side panels. These seats, however, are much deeper than the seats 40 and are recessed the full thickness of the side panel so that the panels and rail will lie flush.

The side flanges are grooved vertically, as at 42, to receive the upper edge of the attaching flanges 15 of the side panels, and the groove at its open end flares to form a throat 43 for ease in inserting the panel edge.

The bottom rails 8 are essentially channel-shaped members having vertical flanges projecting upwardly from their upper corners. These are substantial duplicates of the top flanges of the top rails, being shaped to conform to the end of the side panels. The bottom rails have upper horizontal flanges 44, lower horizontal flanges 45 and vertical webs 46 connecting the two flanges. The flanges 44 are short and recessed on their upper sides to form seats 47. The flanges 45 are longer than the upper ones and are spaced from them a distance equal to the spacing between the flanges 33 and 34 of the base panel edging. This will permit the base panel edging to interfit with the bottom rails, the edging flanges 33 resting in the seats 47 and the rail flanges 45 fitting within the seats adjacent the flanges 34 of the edging. In other words, the bottom rail and the bottom panel edging interfit in stepped relation, each having a flange resting upon a seat in the other, to provide continuity of the panel surfaces, top and bottom.

As mentioned above, the construction of the front frame 5 is not important to the present invention. It is shown in more or less conventional form as a front panel, curved at the sides, and being a complete unit. The only important feature is that the top and bottom at each side conform to the top and bottom rails 7 and 8 so that they may be connected together.

The rear frame 6 need not be of any particular construction insofar as the present invention is concerned. It is shown as having side posts 48, channeled top member 49, and bottom back plate 50. An anchoring flange 51 provides means for tying the side and top panels to the rear frame. The bottom is shown as having a recessed seat 52 to receive the flange 34 of a bottom panel and a ledge 53 on which the flange 33 may rest. The side plate 54 is adapted to have the web 46 of the side rails riveted or otherwise secured to it. The bottom flange 45 of the rail will be cut away in this area.

With the above described elements, trailer or truck bodies of various sizes may be constructed following a standard, or base, pattern. The top and bottom rails 7 and 8 are fastened at their ends to the front and rear frames, as described. This provides a rigid skeletal form outlining the body. The panels are put in place to fill in the various rectangular openings to complete the body.

The top panels are laid in place, spanning the top rails. The end portions adjacent the frame members will drop in place in the seats 40 of the top rails, and the end flanges 21 will lie upon the tops of the rail flanges 38. Rivets 55 may be used to fix the panels to the top rail. The panels are laid in position with their side flanges 21 overlapping, and these are riveted together, as at 56. Due to the fact that each panel has its flange 21 midway between the sides, the panels will be slightly stepped, but this will be of little consequence as the metal is thin and the offset slight.

The side panels, also, will be put in place between the top and bottom rails and fastened securely. These panels will be positioned by inserting the top edges of the securing flange in the groove 42 in the top rail so that the inclined side edges of the panel seat firmly in the seat 41. At this time, the lower end will fit nicely into the seat 57 in the vertical projecting flange 58 of the bottom rail. Rivets 59 through the top rail and 60 through the bottom rail will secure the panel in place.

The side panels will have their side flanges 15 overlapped, in the manner of the top panels, and fastened together by rivets 61. If desired, the joint between each two side panels may include a lock strip 62, fixed along the joint by the rivet 61, and a cover plate 63 designed to snap over the lock strip and conceal the rivets.

The metal of the side panels is thicker than that of the roof panels and, therefore, there will be more offset in adjacent panels if the peripheral attaching flanges are midway between the sides of the panel. To overcome this, the flanges at the long sides of the panels may be inclined, as shown at 64 in Figure 7. This will permit the flanges to seat one upon another and the panels to lie in surface alignment with each other. In this case, joint cover strips 65 may be used both inside and out to preserve the flush wall appearance.

The floor panels will drop into position on the bottom rails and upon one another. It will be seen from Figure 4 that the short flanges 34 of the bottom panel edge extrusions will pass between the inner edges of the short upper flanges 44 of the opposed bottom rails 8 to rest upon the longer lower flanges 45. The side edges of the bottom panel will have the extrusions reversed, as described and as shown in Figure 8, and the lower short flange 34 of one will drop past the upper short flange 34 of the next to rest upon the lower long flange. This provides a shiplap and will allow ease of assembly and ready removal and replacement of a panel. When the panels are in place, rivets 66 are used to join each pair of overlapping flanges. This will form a smooth, flush floor from end to end and from side to side, free from projecting reinforcements, joint covers, etc.

The trailer body formed will be a straight frame design. This basic body will be capable of being insulated to form a reefer or a deep freeze van. The same principles can be used in a drop frame design to give an extremely high cubage van.

While the above described structure provides one practical embodiment of the invention, other arrangements of some of the described elements can be used to advantage with conventional parts, and some of the described elements may be modified for still other uses.

In Figures 12 and 13 there is shown a slightly different arrangement. The top rail 7 and top and side panels 2 and 3 are the same as before, but a different bottom rail 67 and bottom panel 68 are shown.

Bottom rail 67 has a lower channel section 69 and an upwardly projecting flange 70. The flange 70 is set back a short distance from the edge of the channel section to form a shoulder 71 to accommodate the bottom attaching flange 15 of the side panel 3 so that it will be inwardly of the side edge of the bottom rail and protected. The vertical flange 70 has an inclined seat 72 to receive the panel in the same manner as the previously described rails. The channel 69 has lower and upper flanges 73 and 74 to embrace the side edges of the floor panel. Two vertically separated and inwardly projecting positioning fins 75 extend longitudinally of the vertical wall 76 of the channel section of the rail against which the floor panel will abut.

The floor panel 68 to be used with this construction has a central core 77 and cover sheets 78 and 79. At the ends of the panel, which will be at the sides of the truck, the projecting ends of the cover sheets are bent at right angles to lie vertically as at 80 and 81, to form a square corner. These ends will fit within the channel sections of the side rails. At their sides, the cover sheets incline toward one another to meet and form attaching flanges 82 similar to those described in connection with the side and top panels. The attaching flanges will be at the center plane of the panels as in the other panels. The indentation found at the joints between adjacent floor sections may be filled with wooden strips 82'. These may be used as nailing strips for loading.

In Figure 14 a still further arrangement is shown. Here, neither the side nor the floor is of honeycomb panel construction, but the side 83 of the vehicle is of conventional structure as is the floor 84. A modified bottom rail 85 is used, which is somewhat similar to the bottom rail shown in Figures 12 and 13. The vertical flange 86 is straight as there is no need for an inclined seat. The lower part 87 of the rail may be of channel form to receive the floor, or as shown, simply right angular to rest on supporting structure.

The top rail 88 is very similar to the top rail previously described. It has the horizontal flange 89 with the inclined seat 90 as before. The vertical section 91, however is modified. It is shaped as a channel having spaced vertical legs 91 and 92 between which the side member may fit, with the inner flange being longer than the outer one to provide a firm backing for the side.

Figure 15 shows a panel construction that differs from that shown in detail in Figures 5, 6 and 7 in that no frame is used. In this form, the honeycomb core 93 is simply sandwiched between the cover sheets 94 and the sheet edges bent to form the bridle-like construction previously described to provide the attaching flanges 95.

It has been found that for many installations it is not necessary to have the surrounding frame described in connection with the first form. This is particularly true where there is to be no pulling strains upon the panel. The core will have sufficient rigidity to prevent collapsing around the edges. At times, where there is to be tension applied to the panel in one direction only, frame members may be used along one or both sides of the panel extending at right angles to the direction of stress. In cases where the stresses to which the panel must be subjected are severe, the frame will be used all the way around as shown and described in connection with the first disclosed embodiment.

In some instances, the panels may be fabricated without the honeycomb core, using a solid, light-weight core instead. Such a construction is shown in Figure 16. Here, a solid core 96, which may be a plastic such as "Styrofoam," is positioned between cover sheets 97 and 98. The cover sheets have the usual surrounding attaching flanges 99 medial of the thickness of the core.

In all of the panel sections, there is a core which is between two sheets of covering material. The cover sheets extend beyond the core and are brought together along inclined paths to form an attaching flange which lies midway between the opposite side faces of the panel. This provides for equal pull on opposite sides of the core thus reducing the crushing effect which pulling forces will have upon the core. This basic structure may be reinforced with wood, or other solid material inserts, along those edges across which strains will be imposed, to relieve the core of compressive forces. Where heavy strains are encountered, the inserts may be continuous as disclosed in connection with the first described embodiment.

While in the above practical embodiments of the invention have been disclosed, it will be understood that the precise details of structure shown and described are merely by way of illustration and the invention may take still other forms within the scope of the appended claims.

What is claimed is:

1. A vehicle body comprising, a front frame, a rear frame, a pair of top rails attached at their ends to the top corners of the front and rear frames so as to form with the front and rear frames a horizontal top rectangle, a pair of bottom rails attached at their ends to the bottom corners of the front and rear frames so as to form with the front and rear frames a horizontal bottom rectangle spaced below the first and with the top rails a pair of horizontally spaced vertical rectangles, multi-ply side panels having perimetral flanges for attachment to the top and bottom rails and to each other to fill the vertical rectangles and provide the sole members bridging the vertical rectangles, multi-ply top panels having perimetral flanges for connection to the top rails and to each other to fill the top horizontal rectangle and provide the sole members bridging the top horizontal rectangle, multi-ply and bottom panels having flanges for attachment to each other and means for connection to the bottom rails to fill the bottom rectangle and provide the sole members bridging the bottom rectangle.

2. In a vehicle body as claimed in claim 1 said side, top and bottom panels all comprising, a core and sheet metal covering skins.

3. In a vehicle body as claimed in claim 1, said top rails being right angular in cross-section having horizontal and vertical flanges for connection to the perimetral attaching flanges of the side and top panels.

4. In a vehicle body as claimed in claim 1, said bottom rails being of channel cross-section and said bottom panels having portions for interfitting relation with the flanges of the channel bottom rails, and a vertical upwardly projecting flange at the top of each of said bottom rails to connect to the flanges of the side panels.

5. In a vehicle body as claimed in claim 1, said top rails being right angular in cross-section having horizontal and vertical flanges for connection to the perimetral attaching flanges of the side and top panels, said bottom rails being of channel cross-section and said bottom panels having portions for interfitting relation with the flanges of the channel bottom rails, and a vertical upwardly projecting flange at the top of each of said bottom rails to connect to the flanges of the side panels.

6. In a vehicle body as claimed in claim 1, said side, top and bottom panels all comprising, a core and sheet metal covering skins, said top rails being right angular in cross-section having horizontal and vertical flanges for connection to the perimetral attaching flanges of the side and top panels, said bottom rails being of channel cross-section and said bottom panels having portions for interfitting relation with the flanges of the channel bottom rails, and a vertical upwardly projecting flange at the top of each of said bottom rails to connect to the flanges of the side panels.

7. A panel for forming vehicle walls comprising, a core, and sheet metal covering skins on each side of said core having their perimetral edge portions brought together and joined beyond the sides of the core to form an attaching flange extending completely around the panel, the attaching flange being located medially of the planes of the covering skins.

8. A panel for forming vehicle walls comprising, a rectangular honeycomb core, and sheet metal covering skins on each side of said core having their perimetral edge portions brought together and joined beyond the sides of the core to form an attaching flange extending completely around the panel, the attaching flange being located medially of the planes of the covering skins.

9. A panel for forming vehicle walls comprising, a core, reinforcing strips at least the thickness of the core along those sides of the core across which pulling strains will be imposed when the panel is in use, and sheet metal covering skins on each side of said core projecting beyond the edges of the core and the reinforcing strips and having their perimetral edge portions brought together and joined beyond the sides of the core and reinforcing strips to form an attaching flange extending completely around the panel, the attaching flange being located medially of the planes of the covering skins.

10. A panel for forming vehicle walls comprising a rectangular core, a rectangular frame surrounding the outside of the core and connected to the edges thereof, and sheet metal covering skins on each side of said core having their perimetral edge portions brought together and joined beyond the sides of the frame to form an attaching flange extending completely around the panel, the attaching flange being located medially of the planes of the covering skins.

11. A panel for forming vehicle walls comprising, a rectangular resin impregnated paper honeycomb core, a rectangular wooden frame surrounding said core and attached to its edges, the frame being at least the thickness of the core, and sheet metal covering skins on each side of the core and frame, said covering skins being bent toward one another about the perimetral edges of the frame and reversely bent to lie parallel to and in contact with one another midway between the outside surfaces of the panel to form an attaching flange extending entirely around the panel.

12. A flooring panel for vehicles comprising, a rectangular honeycomb core, sheet metal covering skins on opposite surfaces of the core, an edging around said core in the form of a metallic extrusion, said extrusion being substantially I-shaped in cross-section having a base, a head and an interconnecting web, the head and base flanges on one side of said web being identical and spaced apart a distance equal to the thickness of the core whereby the covering skins may overlie said flanges, said flanges being grooved and said skins having turned down flanges to seat in the grooves to tie the extrusion to the skins, the flanges on the opposite side of the web being of different lengths to provide outwardly projecting long and short flanges, the edging extrusion along a first side edge of the core being so oriented that said short outwardly projecting flange of the extrusion is adjacent one surface of the panel and the edging extrusions along the remaining side edges of the core are inverted relative to the edging extrusion along said first side of the core.

13. In a flooring panel for vehicles as claimed in claim 12, said short outwardly projecting flange being recessed to provide a seat for a flange of an adjoining similar flooring panel.

14. In a flooring panel for vehicles as claimed in claim 12, said honeycomb core being of resin impregnated paper.

15. A flooring panel for vehicles comprising, a rectangular core, sheet metal covering skins on each side of the core and projecting beyond the edges of the core, the covering skins along the short ends of the core being bent at right angles to overlie one another and the ends of the core, and the skins along the long sides of the core being brought together beyond the sides of the core to form attaching flanges, the attaching flanges being midway between the planes of the covering skins.

References Cited in the file of this patent

UNITED STATES PATENTS

| | | |
|---|---|---|
| 1,197,188 | Dake | Sept. 5, 1916 |
| 1,253,763 | Zahner | Jan. 15, 1918 |
| 1,928,902 | Lewis | Oct. 3, 1933 |
| 2,100,323 | Fitch | Nov. 30, 1937 |
| 2,400,253 | Ostlund | May 14, 1946 |
| 2,720,948 | Pajak | Oct. 18, 1955 |
| 2,730,772 | Jones | Jan. 17, 1956 |
| 2,744,042 | Pace | May 1, 1956 |

FOREIGN PATENTS

| | | |
|---|---|---|
| 561,214 | Great Britain | May 10, 1944 |
| 732,191 | Great Britain | June 22, 1955 |

OTHER REFERENCES

Article "Prefabricated Shapes for Magnesium Truck Bodies," in "Automotive Industries," page 31 of September 15, 1947.